United States Patent [19]

Rowland

[11] Patent Number: 4,526,685
[45] Date of Patent: Jul. 2, 1985

[54] WASTE WATER TREATMENT PLANT

[75] Inventor: Gerald Rowland, Aston Clinton, England

[73] Assignee: Klargester Environmental Engineering Ltd., Buckinghamshire, England

[21] Appl. No.: 599,251

[22] Filed: Apr. 11, 1984

[30] Foreign Application Priority Data

Dec. 22, 1983 [GB] United Kingdom ............... 8334256

[51] Int. Cl.³ .................................................. C02F 3/08
[52] U.S. Cl. ..................................... 210/138; 210/151; 210/197
[58] Field of Search ............... 210/619, 150, 151, 138, 210/195.1, 197

[56] References Cited

U.S. PATENT DOCUMENTS

| | | | |
|---|---|---|---|
| 3,534,857 | 10/1970 | Berk | 210/151 |
| 3,703,961 | 11/1972 | Feuer | 210/151 |
| 3,966,604 | 6/1976 | Diggs | 210/151 X |
| 4,028,245 | 6/1977 | Stahler | 210/151 |
| 4,093,539 | 6/1978 | Guarino | 210/150 X |

*Primary Examiner*—Thomas Wyse
*Attorney, Agent, or Firm*—Dann, Dorfman, Herrell & Skillman

[57] ABSTRACT

To desludge the final settlement tank of a waste water treatment plant which includes a bio zone equipped with slowly rotating rotors on which biomass deposited from the waste water is digested by microorganisms as the biomass is periodically exposed to air, the level of liquid in the final settlement tank is raised above that in the bio zone so that gravity induced desludging can occur. One of the rotating rotors can be equipped with water lifting means to generate the required hydraulic head for desludging.

Skimming off of scum from the surface of the water in the final settlement tank can also be effected using the hydraulic head between the tank and the bio zone.

10 Claims, 3 Drawing Figures

WASTE WATER TREATMENT PLANT

BACKGROUND OF THE INVENTION

1. Field of the Invention

This invention relates to the treatment of waste water containing biological impurities (e.g. sewage) to break down the impurities by reaction with micro-organisms and thereby render the waste water less noxious and more easily disposable (e.g. in natural water courses).

In particular, the invention relates to a biomass-containing waste water treatment plant which comprises at least one first stage in which the biomass is subjected to digestion by microorganisms and in which an initial separation between solid and liquid constituents of the waste water is effected and a final settlement zone in which residual solids can settle out from the liquid phase of the treated waste water.

2. Description of the Prior Art

Typically there are two preliminary stages, the first being a primary settlement zone that receives the waste water from the source thereof and feeds the water (after removal of the heavier solids therefrom) to a bio zone where the aforesaid biomass digestion occurs, usually on the surface of slowly rotating rotors which become coated with the biomass and periodically lift the biomass out of the carrier water to transport it into the oxygenrich atmospheric environment. The liquid phase, leaving the bio zone, flows into the final settlement zone.

Normally the waste water flows by gravity from the at least one first stage to the final settlement zone so that the free liquid level in the latter zone is slightly below the free liquid level in the bio zone. Some sludge settlement occurs in the final settlement zone and this has to be removed from time to time. Desludging of the primary settlement zone is also effected periodically and there are operating advantages to be gained from transferring the sludge from the final settlement zone to the at least one first stage, and, where such is provided, into the primary settlement zone.

With the normal operating hydraulic levels, transferring sludge from the final settlement zone upstream thereof, involves a pumping operation and it is known to provide a sludge pump to overcome the natural head differential that exists. Such a sludge pump (which can be mechanical or air lift) needs to be provided, maintained and powered, thus adding to the installation costs, running costs and servicing costs of the waste water treatment plant.

This invention relates to an improved method of operating a waste water treatment plant and to an improved water treatment plant in which the need for such a sludge pump is avoided.

SUMMARY OF THE INVENTION

According to one aspect of the invention, a method of desludging the final settlement zone of a waste water treatment plant, comprises lifting the water into the final settlement zone from at least one upstream stage to leave the free liquid surface in the final settlement zone above that in the at least one upstream stage, and using the head of water existing between said zone and stage(s) to cause gravity-assisted flow of sludge back from said zone to said at least one stage.

Preferably the head of water can also be used to remove surface scum from the contents of the final settlement zone, and this can be effected using a flexible pipe as will be explained hereafter.

Expressed in terms of apparatus, the invention comprises water lifting means on a rotating member in a stage of the plant upstream of the final settlement zone, means to rotate the said member to lift water thereby to a level above that of the said stage and above that of the final settlement zone, means to collect water from said lifting means to feed it to the final settlement zone, a sludge return pipe opening close to the bottom of the final settlement zone and leading to a stage upstream of the final settlement zone and valve means in said sludge return pipe for controlling the flow therethrough.

Suitably the valve means is timer controlled, the timed cycles of opening and closing of the valve means being chosen to prevent the sludge level in the bottom of the final settlement zone rising significantly.

A hydraulic head of (say) 5 to 15 cms of water would normally be preferred. The lower limit is set by there being adequate back flow to lift the sludge and the upper limit is set by the flow rate not being so great as to "core" the sludge deposits around the inlet end of the sludge return pipe.

Conveniently the sludge return pipe is also provided with an open ended flexible tube teed into it at some convenient point (typically upstream of the valve means) since the simple provision of such a flexible tube allows scum on the surface of the water in the final settlement zone to be also returned to the at least one first stage. If the open end of the flexible tube is lowered to the surface of the water in the final settlement zone, the existence of the hydraulic head can be used to cause surface water (and any scum floating thereon) to flow into the flexible tube and be led back to earlier treatment stages. A facility for descumming the final settlement zone is particularly useful, since the scum which forms here can be rich in the microorganisms that are valuable for digestion of the biomass in the earlier stage(s) of the plant.

BRIEF DESCRIPTION OF THE DRAWINGS

One embodiment of sewage treatment plant in accordance with the invention will now be described, by way of example, with reference to the accompanying drawings, in which.

DESCRIPTION OF THE PREFERRED EMBODIMENT

Figure 1:
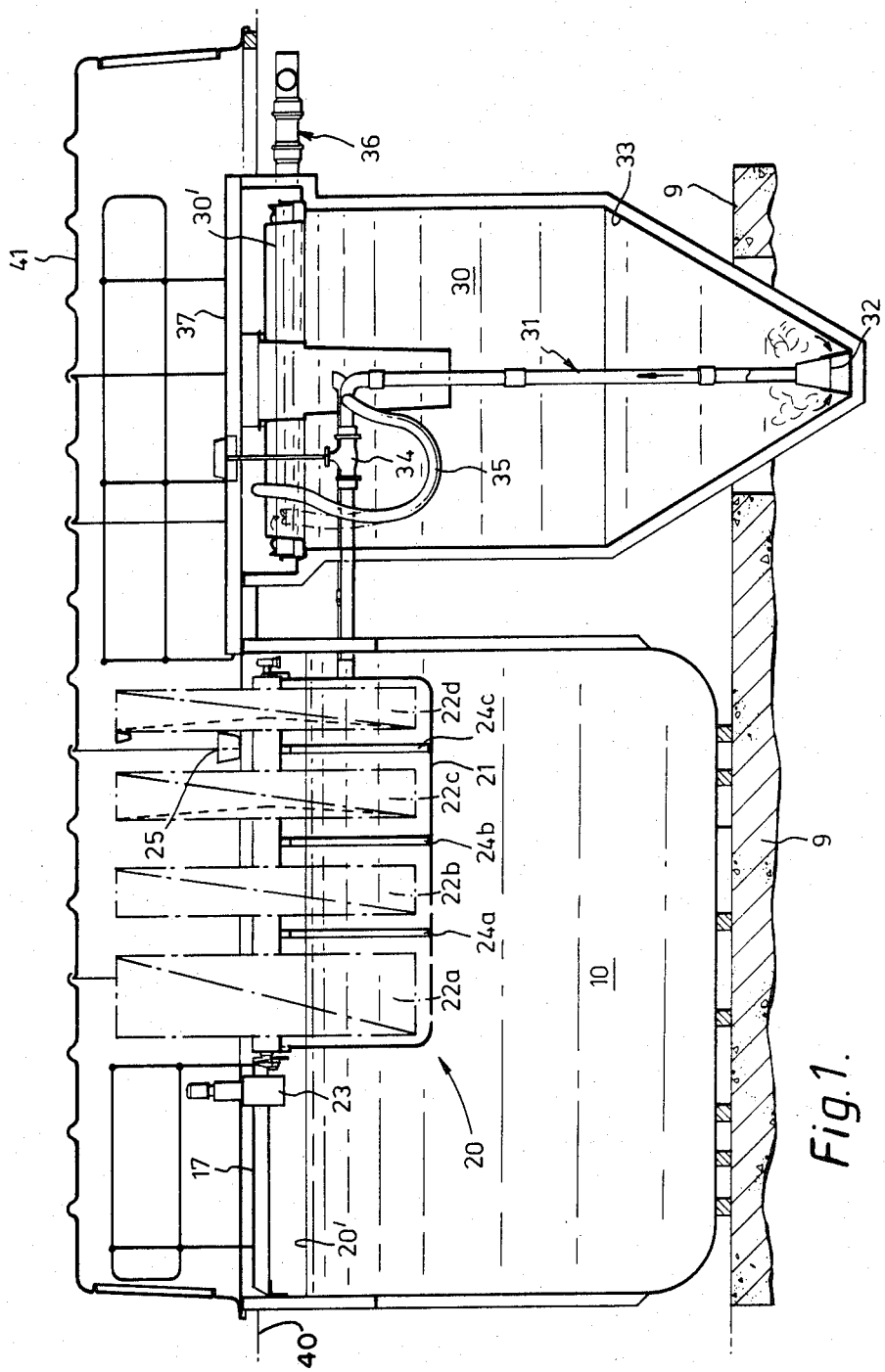
FIG. 1 is a sectional side elevational view of the plant.
Figure 2:
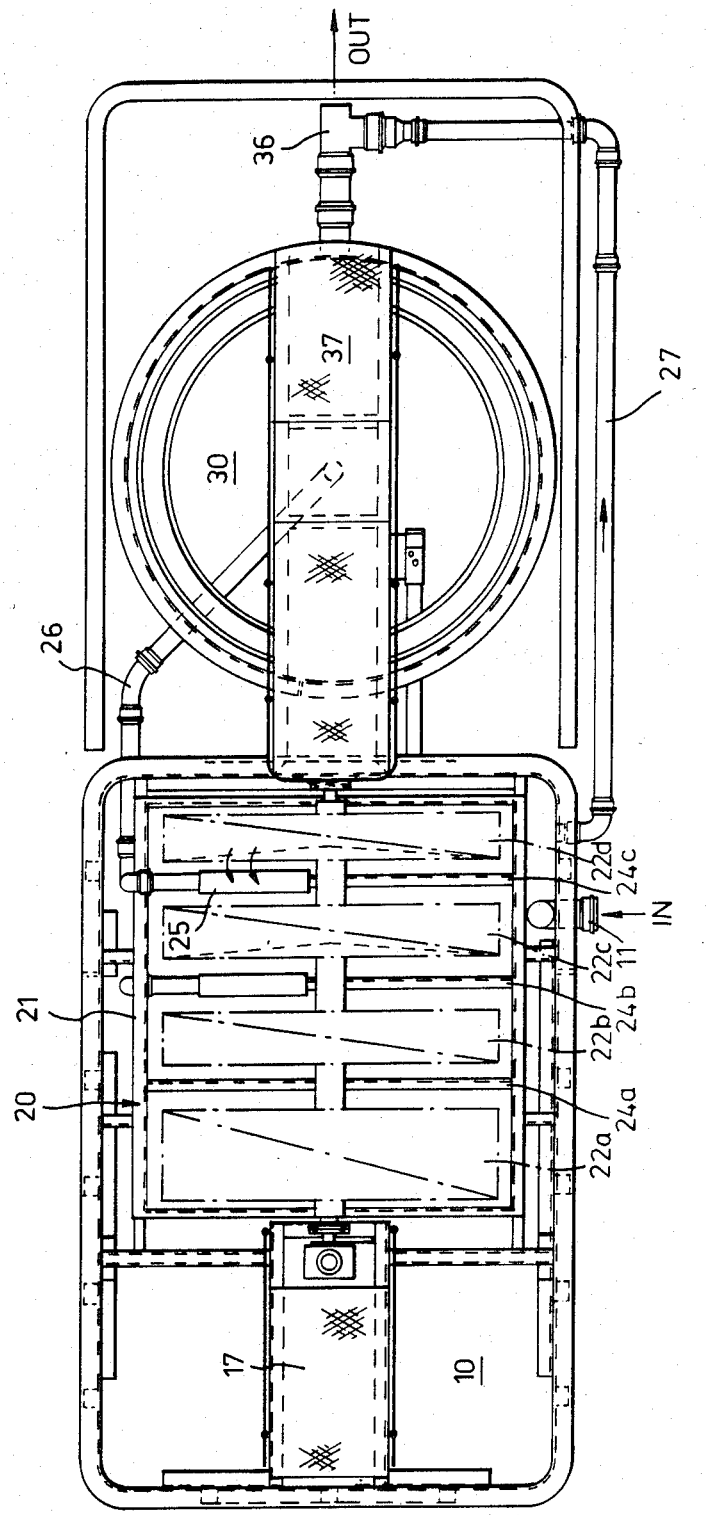
FIG. 2 is a plan of the plant.
Figure 3:
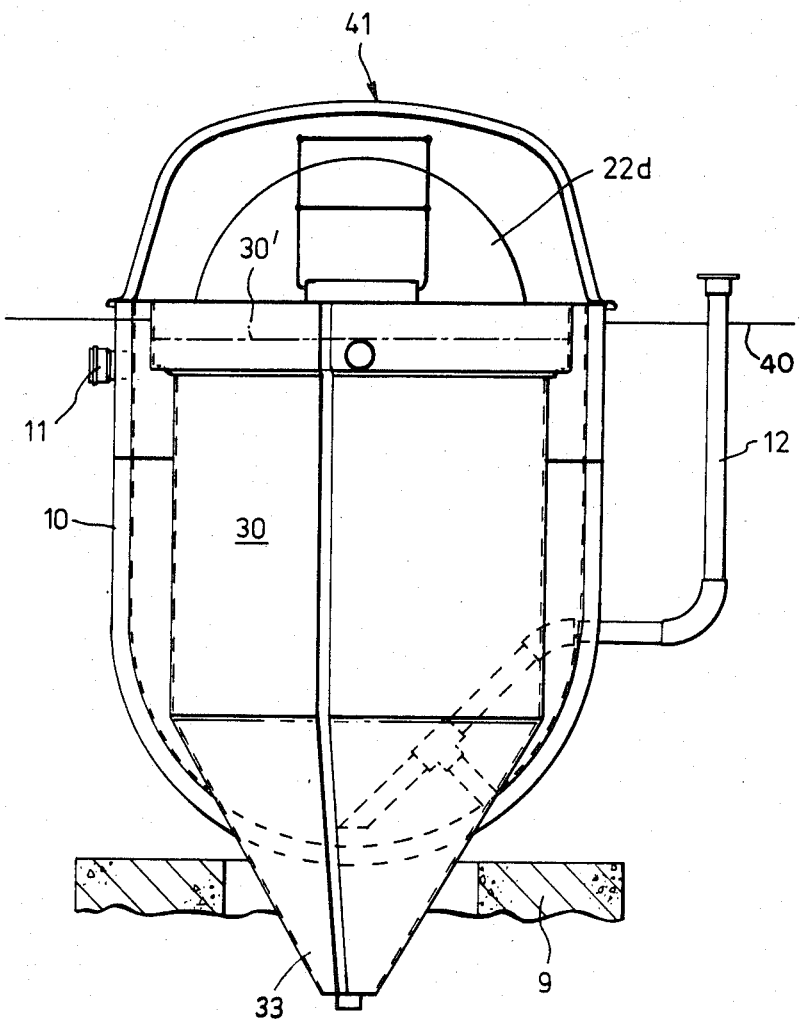
FIG. 3 is an end elevational of the plant.

The plant shown in the drawings is designed for the biological purification of raw sewage and comprises a primary settlement tank 10, a bio zone 20 and a final settlement tank 30.

The bio zone 20 comprises a housing 21 located in the upper part of the primary tank 10, which housing contains four banks of rotatable circular bio discs 22a to 22d. Each bank of discs is rotated by a drive motor/gearbox unit 23 so that the discs become coated with a thin layer of biomass from the water in the housing 21 and periodically subject these layers to a period in the atmosphere. The microorganisms naturally present in the sewage feed and multiply very rapidly in the cycling submerged and exposed periods to which they are subjected on the surfaces of the discs. The microorganisms rapidly break down the biomass layers.

The raw sewage is fed, via a pipe 11, to the primary tank and from there, after losing its heavier solids (which sink to the bottom of the tank 10 for periodic removal via a desludge pipe 12), it passes into the housing 21 adjacent to the first bank 22a of discs.

Transverse baffles 24a, 24b and 24c force the purifying sewage to follow a sepentine path through the housing 21, until eventually the sewage reaches the last disc bank 22d. Openings are provided in the bottom of the housing 21, adjacent to its upstream end, to allow sediment falling off the discs to drop down into the tank 10, but there will still be some solids matter entrained in the water which enters the final compartment of the housing 21 which contains the last disc pack 22d.

The liquid from the downstream end of the housing 21 is now led to the final tank 30. Normally this would be a simple gravity feed requiring the liquid level in the tank 30 to be below that in the housing 21.

In the plant illustrated, however, the last disc pack 22d is used to lift water out of the housing 21 and pour it into a trough 25, from whence it passes, via a feed pipe 26, to the tank 30. The means used to lift the water is not a critical design feature and one or more simple bucket-like receptacles on the periphery of at least one disc in the last pack 22d will suffice for this purpose.

The buckets (or the like) are arranged to lift something more than the average flow of sewage to the plant, so that there is no reason why the water level in the tank 10/housing 21 should attain a dangerously high level. An overflow pipe 27 is, however, provided in case an excessive inflow should arise.

With the water level in the tank 30 (indicated at 30') some centimeters higher than that in the earlier treatment stages (indicated at 20'), desludging of the tank 30 is an easy matter using a sludge return pipe 31 (having an opening 32 close to the tapered bottom 33 of the tank 30) and a motorised valve 34 controlling the flow of liquid through the opening 32.

The sludge return pipe 31 leads back to the tank 10, so that sludge lifted up by the flowing water is returned to the tank 10 to be removed via the pipe 12.

The duty cycle of the valve 34 can be set to ensure adequate desludging of the tank 30 and the provision of the small head of water favouring back flow from the tank 30, means that desludging of the final settlement tank 30 can be effected without the need for the mechanical pumps or the air lift devices known in prior art plants.

To descum the surface of the water in the final settlement tank 30, a flexible tube 35 is provided which connects with the sludge return pipe 31 just upstream of the valve 34. If the free end of the tube 35 is periodically lowered to the surface of the water in the tank 30, any humus floating on the surface can be withdrawn and fed back to the tank 10, merely by opening the valve 34. A manual override of the normal electrical operation of the valve 34 can conveniently be provided to allow this to be done when required.

An outlet pipe 36 from the tank 30 allows the purified water to be led off (e.g. to a suitable natural water course or to a storage tank for periodic collection).

Walkways 17 and 37 of a known kind are provided to facilitate maintenance and supervision of the plant.

Footings 9 can be provided on which the tanks 10, 30 rest and ground level can be at the line 40. Covers 41 are provided (which can be lockable) to protect the plant in the usual way.

Many modifications can be made to the plant described above with reference to the drawings and all such modifications falling within the scope of the following claims are within the ambit of the invention.

What is claimed is:

1. In a waste water treatment plant including
   first tank means defining a bio zone,
   means to feed waste water to said bio zone tank means to generate a liquid level therein,
   at least one rotor means rotatable about an axis and dipping only partially below the liquid level in the bio zone tank means,
   drive means to turn said at least one rotor means about said axis to periodically convey an area of said rotor means through said waste water and then through the air above said liquid level,
   second tank means defining a settlement zone,
   means to feed liquid from said bio zone to said settlement zone, and duct means to feed purified liquid from the settlement zone away from the plant, and
   desludging means in said second tank means to suck sludge collected in the second tank means back into the bio zone,
   the improvement which includes
   arranging said means which feed liquid from said bio zone to said settlement zone to lift the liquid above the liquid level in the bio zone, whereby
   said desludging means operates on the head of water existing between the bio zone and the settlement zone.

2. Waste water treatment plant as claimed in claim 1, in which means is provided to use the said head of waste to remove surface scum from the settlement zone.

3. Waste water treatment plant as claimed in claim 1, in which the desludging means includes a timer controlled valve means and means to generate timed cycles of opening and closing of the valve means.

4. Waste water treatment plant as claimed in claim 1, in which the means to lift water above the liquid level in the bio zone include water lifting means on the at least one rotor means.

5. A waste water treatment plant including
   first tank means defining a bio zone,
   means to feed waste water to said bio zone tank means to generate a first liquid level therein,
   a plurality of rotating members, each rotatable about an axis and each dipping only partially below the first liquid level in the bio zone tank means,
   drive means to turn said rotating members about said axis to periodically convey an area of each of said members through said waste water and then through the air above said liquid level,
   second tank means defining a final settlement zone,
   means to feed liquid from said bio zone to said final settlement zone to define a second liquid level therein, and duct means to feed purified liquid from the final settlement zone away from the plant,
   desludging means in said second tank means to suck sludge collected in the second tank means back into the bio zone,
   water lifting means on at least one of said rotating members arranged to lift water to a third level above that of the second liquid level,
   means to collect water from said lifting means and feed it to the final settlement zone,
   said desludging means including a sludge return pipe opening close to the bottom of the final settlement zone and leading to a stage in the plant upstream of the final settlement zone, and valve means in said sludge return pipe for controlling the flow therethrough.

6. A waste water treatment plant as claimed in claim 5, in which the valve means is timer controlled, the timed cycles of opening and closing of the valve means being chosen to prevent the sludge level in the bottom of the final settlement zone rising significantly.

7. A waste water treatment plant as claimed in claim 6, in which the water lifting means is arranged to make the second liquid level between 5 and 15 cms above the first liquid level.

8. A waste water treatment plant as claimed in claim 5, in which the sludge return pipe is also provided with an open ended flexible tube teed into it upstream of the valve means which flexible tube allows scum on the surface of the water in the final settlement zone to be also returned to the upstream stage.

9. A waste water treatment plant as claimed in claim 5, in which the first tank forms a housing located in an upper part of a primary settlement tank into which primary settlement tank the sludge pipe empties.

10. A waste water treatment plant as claimed in claim 9, in which the said housing is provided with baffles to force waste water to follow a serpentine path in flowing through the housing, the rotating members being coaxial discs formed in banks, each baffle being disposed between end discs in adjacent banks.

* * * * *